United States Patent
Shanklin et al.

(10) Patent No.: US 6,578,147 B1
(45) Date of Patent: Jun. 10, 2003

(54) PARALLEL INTRUSION DETECTION SENSORS WITH LOAD BALANCING FOR HIGH SPEED NETWORKS

(75) Inventors: Steven D. Shanklin, Austin, TX (US); Gerald S. Lathem, Elgin, TX (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/232,276

(22) Filed: Jan. 15, 1999

(51) Int. Cl.$^7$ .............................................. H04L 12/00
(52) U.S. Cl. .................... 713/200; 709/103; 709/105
(58) Field of Search ................................ 709/224, 223, 709/228, 240, 242, 105, 103

(56) References Cited

U.S. PATENT DOCUMENTS

| | | | |
|---|---|---|---|
| 5,032,979 A | 7/1991 | Hecht et al. | 364/200 |
| 5,101,402 A | 3/1992 | Chiu et al. | 370/17 |
| 5,278,901 A | 1/1994 | Shieh et al. | 380/4 |
| 5,414,833 A | 5/1995 | Hershey et al. | 395/575 |
| 5,448,724 A | 9/1995 | Hayashi | 395/182.02 |
| 5,488,715 A | 1/1996 | Wainwright | 395/182.02 |
| 5,493,689 A * | 2/1996 | Waclawsky et al. | 395/821 |
| 5,524,238 A | 6/1996 | Miller et al. | 395/600 |
| 5,557,742 A | 9/1996 | Smaha et al. | 395/186 |
| 5,568,471 A * | 10/1996 | Hershey et al. | 370/17 |
| 5,606,668 A | 2/1997 | Shwed | 395/200.11 |
| 5,621,889 A | 4/1997 | Lermuzeaux et al. | 395/186 |
| 5,699,513 A | 12/1997 | Feigen et al. | 395/187.01 |
| 5,774,660 A * | 6/1998 | Brendel et al. | 395/200.31 |
| 5,793,763 A | 8/1998 | Mayes et al. | 370/389 |
| 5,796,942 A | 8/1998 | Esbensen | 395/187.01 |
| 5,798,706 A | 8/1998 | Kraemer et al. | 340/825.07 |
| 5,805,801 A | 9/1998 | Holloway et al. | 395/187.01 |
| 5,826,014 A | 10/1998 | Coley et al. | 395/187.01 |
| 5,918,021 A * | 6/1999 | Aditya | 395/200.65 |
| 5,919,257 A | 7/1999 | Trostle | 713/200 |
| 5,931,946 A | 8/1999 | Terada et al. | 713/201 |
| 5,958,009 A * | 9/1999 | Friedrich et al. | 709/224 |
| 5,991,881 A | 11/1999 | Conklin et al. | 713/201 |
| 6,088,796 A * | 7/2000 | Cianfrocca et al. | 713/152 |
| 6,167,538 A * | 12/2000 | Neufeld et al. | 714/47 |
| 6,279,113 B1 * | 8/2001 | Vaidya | 713/201 |
| 6,321,338 B1 * | 11/2001 | Porras et al. | 713/201 |

OTHER PUBLICATIONS

Microsoft Press; Microsoft Corporation, Microsoft Press Computer Dictionary. 1997, 3rd Edition, pp. 415 and 454, , includes 2 pages (printouts).*

(List continued on next page.)

Primary Examiner—Gail Hayes
Assistant Examiner—Leynna Ha
(74) Attorney, Agent, or Firm—Baker Botts L.L.P.

(57) ABSTRACT

Various embodiments of a method and system for detecting unauthorized signatures to or from a local network. Multiple sensors are connected at an internetworking device, which can be a router or a switch. The sensors operate in parallel and each receives a portion of traffic through the internetworking device, at a session-based level or at a lower (packet-based) level. Depending on the type of internetworking device (router or switch) the load balancing mechanism that distributes the packets can be internal or external to the internetworking device. Also depending on the level of packet distribution (session-based or packet-based), the sensors share a network analyzer (if session-based) or both a network analyzer and a session analyzer (if packet-based).

25 Claims, 3 Drawing Sheets

OTHER PUBLICATIONS

Scambray, J., Infoworld Publications, Inc., Package Detects most Intrusions. Feb. 1998, vol. 20, pp. 43, 48.*

Millikin, M., Horizon House Publications,Inc., Managing Intranet Complexity with Open–System Tools. Aug. 1997, vol. 31, pp. S10–S12, includes 5 pages (printouts).*

Thomas, B., Business Wire, Enigma Logic Introduces Safe Word AS Advanced Client Server Sofware Fore Secure User Authentication. May 1995, Section 1, includes 2 pages (printouts).*

"Preliminary Report on Advanced Security Audit Trail Analysis on UNIX," N. Habra et al., pp. 1–34 (found at http://www.cs.purdue.edu/coast/archive/data/categ24.html), Sep. 1994.

"Idiot–Users Guide," M. Crosbie, et al., pp. 1–63, (found at http://www.cs.purdue.edu/coast/archive/data/categ24.html), Sep. 1996.

"Use of A Taxonomy of Security Faults," T. Aslam, et al., pp. 1–10, (found at http://www.cs.purdue.edu/coast/archive/data/categ24.html), Sep. 1996.

"Artificial Intelligence and Intrusion Detection: Current and Future Directions," Jeremy Frank, pp. 1–12, (found at http://www.cs.purdue.edu/coast/archive/data/categ24.html), Jun. 1994.

"An Application of Pattern Matching in Intrusion Detection", S. Kumar, et al., pp. 1–55, (found at http://www.cs.purdue.edu/coast/archive/data/categ24.html), Jun. 1994.

"A Software Architecture to Support Misuse Intrusion Detection", S. Kumar, et al., pp. 1–17, (found at http://www.cs.purdue.edu/coast/archive/data/categ24.html), Mar. 1995.

"Defending a Computer System Using Autonomous Agents", M. Crosbie, et al., pp. 1–11, (found at http://www.cs.purdue.edu/coast/archive/data/categ24.html), Mar. 1994.

Master Thesis entitled USTAT A Real–time Intrusion Detection System for UNIX, University of California, K. Ilgun, pp. 1–204, (found at http://www.cs.purdue.edu/coast/archive/data/categ24.html), Nov. 1992.

"A Weakness in the 4.2BSD Unix TCP/IP Software", R. Morris, 4 pages, (found at http://www.cs.purdue.edu/coast/archive/data/categ30.html), Feb., 1985.

"A Best–Case Network Performance Model", S.M. Bellovin, pp. 1–10, (found at http://www.cs.purdue.edu/coast/archive/data/categ30.html), Feb. 1992.

"OARnet Security Procedures", K. Varadhan, pp. 1–14, (found at http://www.cs.purdue.edu/coast/archive/data/categ30.html), Sep. 1992.

"Paving The Road To Network Security Or The Value Of Small Cobblestones", H. Orman, et al., pp. 1–17, (found at http://www.cs.purdue.edu/coast/archive/data/categ30.html), May 1994.

"Packets Found on an Internet", S. Bellovin, pp. 1–6, (found at http://www.cs.purdue.edu/coast/archive/data/categ30.html), Aug. 1993.

"Security Problems in the TCP/IP Protocol Suite", S.M. Bellovin, (reprinted from Computer Communication Review, vol. 19, No. 2, pp. 32–48) pp. 1–17, Apr. 1989.

"A Security Analysis of the NTP Protocol", Matt Bishop, pp. 1–20, (found at http://www.cs.purdue.edu/coast/archive/data/categ30.html), 1990.

"WAN–hacking with AutoHack–Auditing Security Behind the Firewall", Alec Muffett, 14 pages, (found at http://www.cs.purdue.edu/coast/archive/data/categ30.html), Jun. 1995.

"ACMAINT: An Account Creation and Maintenance System for Distributed UNIX Systems", D.A. Curry, et al., pp. 1–9, (found at http://www.cs.purdue.edu/coast/archive/data/categ30.html), Oct. 1990.

Masters Thesis entitled "Addressing Weaknesses In The Domain Name System Protocol", Purdue University, Christoph Schuba, pp. 1–87., (found at http://www.cs.purdue.edu/coast/archive/data/categ30.html), Aug. 1993.

"Secure RPC Authentication (SRA) for TELNET and FTP", D.R. Safford, et al., pp. 1–5, (found at http://www.cs.purdue.edu/coast/archive/data/categ30.html), 1993.

"Insertion, Evasion, and Denial of Service: Eluding Network Intrusion Detection", T.H. Ptacek et al., pp. 1–63, Jan. 1998.

"A Method to Detect Intrusive Activity in a Networked Environment", L.T. Heberlein et al., *Proc. of the 14th National Computer Security Conference*, Oct. 1991, pp. 362–371., (found at http://seclab.cs.ucdavis.edu/papers.html.).

"Internetwork Security Monitor: An Intrusion–Detection System for Large–Scale Networks", L.T. Heberlein et al., *Proc. of the 15th National Computer Security Conference*, Oct. 1992, pp. 262–271.

"Comparison Between Internet Security Scanner (ISS) 1.x and Internet Scanner 3.2", by Internet Security Systems., (found at http://www.iss.net), 1996.

"Automated Tools for Testing Computer System Vulnerability", W.T. Polk, 40 pages, Dec. 1992.

The Design of GrIDS: A Graph–Based Intrusion Detection System, S. Cheung et al., *U.C. Davis Computer Science Department Technical Report SCE–99–2*, 1999, pp. 1–47, (found at http://seclab.cs.ucdavis.edu/papers.html.), Jan. 26, 1999.

"Luby–Rackoff Backwards: Increasing Security by Making Block Ciphers Non–Invertible", M. Bellare, et al., *Advances in Cryptology–Eurocrypt 98 Proceedings, Lecture Notes in Computer Science*, vol. 1403 Springer–Verlat (1998) pp. 1–27, (found at http://seclab.cs.ucdavis.edu/papers.html.), Oct. 17, 1998.

"Detecting Disruptive Routers: A Distributed Network Monitoring Approach", K.A. Bradley, et al., *Proceedings of the 1998 IEEE Symposium on Security and Privacy*, Oakland, CA, pp. 115–124 (found at http://seclab.cs.ucdavis.edu/papers.html.), May 1998.

"Stack and Queue Integrity on Hostile Platforms", P.T. Devanbu, et al., *IEEE Symposium on Security and Privacy*, Oakland CA, (found at http://seclab.cs.ucdavis.edu/papers.html.), 1998.

"Techniques for Trusted Software Engineering", P.T. Devanbu et al., *Proceedings of the 20th International Conference on Software Engineering*, Kyoto, Japan, (found at http://seclab.cs.ucdavis.edu/papers.html.), 1998.

"Data Level Inference Detection in Database Systems", R.W. Yip et al., *Proceedings of the 11th IEEE Computer Security Foundations Workshop*, Rockport, Massachusetts, (found at http://seclab.cs.ucdavis.edu/papers.html.), 1998.

"The Design and Implementation of a Data Level Database Inference Detection System",.Yip et al., *Proceedings of the Twelfth Annual IFIP WG 11.3 Working Conference on Database Security*, Chalkidiki, Greece 14 pages, (found at http://seclab.cs.ucdavis.edu/papers.html.), 1998.

"Theft of Information in the Take–Grant Protection Model", Matt Bishop, 35 pages, *Journal of Computer Security* 4(4)(1996), (found at http://seclab.cs.ucdavis.edu/papers.html.), Mar. 13, 1997.

"Information Survivability, Security, and Fault Tolerance", Matt Bishop, position paper for the Information Survivability Workshop *Journal of Computer Security* ™6) 1 page, (found at http://seclab.cs.ucdavis.edu/papers.html.), 1997.

"Teaching Computer Security", Matt Bishop, position paper for the *Workshop on Education in Computer Security*, Monterey CA, 3 pages, (found at http://seclab.cs.ucdavis.edu/papers.html.), 1997.

"Protecting Routing Infrastructures from Denial of Service Using Cooperative Intrusion Detection", S. Cheung et al., *Proc. new Security Paradigms Workshop*, Cumbria, UK 13 pages, (found at http://seclab.cs.ucdavis.edu/papers.html.), 1997.

"An Efficient Message Authentication Scheme for Link State Routing", S. Cheung, *Proc. 13th annual Computer Security Applications Conference*, San Diego, CA, 9 pages, (found at http://seclab.cs.ucdavis.edu/papers.html.), 1997.

"Cyrptographic Verification of Test Coverage Claims", P. Devanbu et al., *Proceedings, Fifth ACM/SIGSOFT Conference on Foundations of Software Engineering* Zurich, Switzerland) (found at http://seclab.cs.ucdavis.edu/papers.html.), 1997.

"Property–Based Testing; A New Approach to Testing for Assurance", Fink et al., *ACM SIGSOFT Software Engineering Notes*, 22(4), (found at http://seclab.cs.ucdavis.edu/papers.html.), 1997.

"Checking for Race Conditions in File Accesses", Bishop et al., *Computing Systems* 9(2)., (found at http://seclab.cs.ucdavis.edu/papers.html.), 1996.

"An Isolated Network for Research", Bishop et al., *The 19th NISSC*, pp. 1–9, (found at http://seclab.cs.ucdavis.edu/papers.html.), 1996.

"Goal–Oriented Auditing and Logging", Bishop et al., submitted to IEEE Transactions on Computing Systems, (found at http://seclab.cs.ucdavis.edu/papers.html.), 1996.

"Extending The Take–Grant Protection System", J. Frank et al., The IEEE Transactions on Computing Systems, (found at http://seclab.cs.ucdavis.edu/papers.html.), 1996.

Network Security Via Reverse Engineering of TCP Code: Vulnerability Analysis and Proposed Solutions, Guha et al., *Proc. of the IEEE Infocom '96*, San Francisco, CA (found at http://seclab.cs.ucdavis.edu/papers.html.), 1996.

"Attack Class: Address Spoofing", Heberlein et al., The 19th National Information System Security Conference, (found at http://seclab.cs.ucdavis.edu/papers.html), 1996.

PhD. Theses entitled Execution Monitoring Of Security––Critical Programs In A Distributed System: A Specification–Based Approach, Calvin Cheuk Wang Ko, 111 pages, (found at http://seclab.cs.ucdavis.edu/papers.html), 1996.

"A Methodology for Testing Intrusion Detection Systems", Puketza et al., *IEEE Transactions on Software Engineering*, vol. 22, No. 10, (found at http://seclab.cs.ucdavis.edu/papers.html), 1996.

"The Exact Security of Digital Signatures–How to Sign with RSA and Rabin", Bellare et al. Earlier Version appears in *Advances in Cryptology—Eurocrypt '96*, LNCS vol. 1070, U. Maurer ed., Springer–Verlag, pp. 399–416), (found at http://seclab.cs.ucdavis.edu/papers.html), 1996.

"How to Protect DES Against Exhaustive Key Search", Kilian et al., Advances in Cryptology—CRYPTO '96., (found at http://seclab.cs.ucdavis.edu/papers.html), 1996.

"GrIDS–A Graph Based Intrusion Detection System For Large Networks", Staniford–Chen et al., *The 19th NISSC*. 10 pages, (found at http://seclab.cs.ucdavis.edu/papers.html), 1996.

"NetKuang–A Multi–Host Configuration Vulnerability Checker", Zerkle et al., *Proc. of the 6th USENIX Security Symposium*, San Jose, CA., (found at http://seclab.cs.ucdavis.edu/papers.html), 1996.

"A Standard Audit Trail Format", Matt Bishop, *Proc. of the 1995 NISSC*, Baltimore, MD., (found at http://seclab.cs.ucdavis.edu/papers.html), 1995.

Abstract entitled Theft of Information in the Take–Grant Protection Model, Matt Bishop, *Journal of Computer Security*, vol. 3, No. 4, (found at http://seclab.cs.ucdavis.edu/papers.html), 1995.

"Improving System Security via Proactive Password Checking", Matt Bishop, *Computers & Security*, vol. 14, No. 3, pp. 233–249, (found at http://seclab.cs.ucdavis.edu/papers.html), 1995.

"Simulating Concurrent Intrusions for Testing Intrusion Detection Systems: Parallelizing Intrusions", Chung et al., *Proc. of the 1995 NISSC*, Baltimore, MD, 11 pages, (found at http://seclab.cs.ucdavis.edu/papers.html), 1995.

"Network Security Monitor", L. Todd Heberlein , *Lawrence Livermore National Laboratory project deliverable*, (found at http://seclab.cs.ucdavis.edu/papers.html), 1995.

"Audit Log Analysis Using the Visual Audit Browser Toolkit", Hoagland et al., *U.C. Davis Computer Science Department Technical Report CSE–95–11*, (found at http://seclab.cs.ucdavis.edu/papers.html), 1995.

"MCF: A Malicious Code Filter", R.W. Lo et al., *Computers & Security*, (1995) vol. 14, No. 6. (27 pages.), (found at http://seclab.cs.ucdavis.edu/papers.html), 1995.

"Bucket Hashing and its Application to Fast Message Authentication", Phillip Rogaway, *Acvances in Cryptology—CRYPTO '95*, (found at http://seclab.cs.ucdavis.edu/papers.html), 1995.

"Provably Secure Session Key Distribution–The Three Party Case", Bellare et al., *Proc., of the 27th Annual ACM Symposium on Theory of Computing*, Las Vegas, NV, (found at http://seclab.cs.ucdavis.edu/papers.html), 1995.

"XOR MACs: New Methods for Message Authentication Using Finite Pseudorandom Functions", Bellare et al.,*Advances in Cryptology—CRYPTO '95*, (found at http://seclab.cs.ucdavis.edu/papers.html), Oct. 1995.

"Holding Intruders Accountable on the Internet", Staniford-–Chen et al., *Proc. of the 1995 IEEE Symposium on Security and Privacy*, Oakland, CA, (11 pages) (found at http://seclab.cs.ucdavis.edu/papers.html), 1995.

"LAFS: A Logging and Auditing File System", Christopher Wee, *Proc. of the 11th Computer Security Applications Conference*, 10 pages, (found at http://seclab.cs.ucdavis.edu/papers.html), 1995.

"Towards a Property–based Testing Environment with Applications to Security–Critical Software", Fink et al., *Proc. of the 4th irvine Software Symposium*. 10 pages, (found at http://seclab.cs.ucdavis.edu/papers.html), 1994.

"Property–based Testing of Privileged Programs", Fink et al., *Proc. of the 10th Annual Computer Security Applications Conference*, Orlando, FL. 10 pages, (found at http://seclab.cs.ucdavis.edu/papers.html), Dec. 1994.

"Artificial Intelligence and Intrusion Detection: Current and Future Directions", Jeremy Frank, *Proc. of the 17th National Computer Security Conference*. 12 pages, (found at http://seclab.cs.ucdavis.edu/papers.html), 1994.

"Automated Detection of Vulnerabilities in Privileged Programs by Execution Monitoring", Ko et al., *Proc. of the 10th Annual Computer Security Applications Conference*, Orlando, FL. (found at http://seclab.cs.ucdavis.edu/papers.html), 1994.

"Common Techniques in Fault–Tolerance and Security", Levitt et al., *Proc. of the Dependable Computing for Critical Applications 4*, San Diego, CA. 4 pages, (found at http://seclab.cs.ucdavis.edu/papers.html), 1994.

"Network Intrusion Detection", Mukherjee et al., *IEEE Network*, May–Jun. 1994, vol. 8, No. 3, pp. 26–41. (found at http://seclab.cs.ucdavis.edu/papers.html), 1994.

"A New Suggestion for How to Encrypt with RSA", Bellare et al., *Eurocrypt '94*, 20 pages, (found at http://seclab.cs.ucdavis.edu/papers.html), 1994.

"The Security of Cipher Block Chaining", Bellare et al., *Advances in Cryptology—CRYPTO '94*, Santa Barbara CA. (19 pages.) (found at http://seclab.cs.ucdavis.edu/papers.html), 1994.

"Analysis Of An Algorithm For Distributed Recognition And Accountability", Ko et al., *Proc. 1st ACM Conference on Computer and Communication Security*. Fairfax, VA, Nov. 1993, 11 pages, (found at http://seclab.cs.ucdavis.edu/papers.html).

"Entity Authentication and Key Disribution". Bellare et al., *Advances in Cryptology—CRYPTO '93*, Santa Barbara, CA, Aug. 1993, pp. 232–249. (found at http://seclab.cs.ucdavis.edu/papers.html).

"Random Oracles are Practical: A Paradigm for Designing Efficient Protocols", Bellare et al., *Proc. of the 1st ACM Conference on Computer and Communication Security*, Fairfax, VA, Nov. 1993, pp. 1545–164. (found at http://seclab.cs.ucdavis.edu/papers.html).

"A Software–Optimized Encryption Algorithm", Rogaway et al., *Proc. of the Fast Software Encryption Cambridge Security Workshop*, Cambridge, UK (16 pages.) (found at http://seclab.cs.ucdavis.edu/papers.html), 1993.

"Anatomy of a Proactive Password Changer", Matt Bishop, *Proc. of the UNIX Security Symposium III* Baltimore, MD, 15 pages. (found at http://seclab.cs.ucdavis.edu/papers.html), 1992.

DIDS (Distributed Intrusion Detection System)– Motivation, Architecture, and An Early Prototype, Snapp et al., *Proc. 14th National Computer Security Conference*, Washington, DC (9 pages.) (found at http://seclab.cs.ucdavis.edu/papers.html), 1991.

"Proactive Password Checking", Matt Bishop, *Proc. of the 7th International Conference on Information Security*, May 1991, pp. 169–181. (found at http://seclab.cs.ucdavis.edu/papers.html).

Dissertation entitled Issues in Debugging Sequential and Concurrent Programs: Methods, Techniques, and Implementation, University of California, Wingshun Wilson Ho, 191 pages. (found at http://seclab.cs.ucdavis.edu/papers.html), 1992.

Abstract entitled "Collaboration Using Roles" by M. Bishop, *Software—Practice and Experience*, vol. 20, No. 5, May 1990. (found at http://seclab.cs.ucdavis.edu/papers.html).

Abstract entitled "An Extendable Password Checker" by M. Bishop, *Proc. UNIX Security II* Portland, OR, Aug. 27–28, 1990, pp. 15–16, (found at http://seclab.cs.ucdavis.edu/papers.html).

Abstract entitled "A Security Analysis of the NTP Protocol Version 2" by M. Bishop, Dec. 1990.

Abstract entitled "A Little Knowledge Goes a Long Way: Faster Detection of Compromised Data in 2–D Tables" by D. Gusfield, *Proc. of the 1990 IEEE Symposium on Research in Security and Privacy*, Oakland, CA, May 7–9, 1990, pp. 86–94, (found at http://seclab.cs.ucdavis.edu/papers.html).

Abstract entitled "A Network Security Monitor" by L.T. Heberlein, G.V. Dias, K.N. Levitt, B. Mukherjee, and others, *Proc. of the 1990 IEE Symposium on Research in Security and Privacy*, Oakland, CA, May 7–9, 1990, pp. 296–304, (found at http://seclab.cs.ucdavis.edu/papers.html).

Abstract entitled "Static Analysis Virus Detection Tools in UNIX Systems" by P. Kerchen, et al., *Proc. 13th National Computer Security Conference*, Washington, DC, Oct. 1–4, 1990, pp. 350–365, (found at http://seclab.cs.ucdavis.edu/papers.html).

Abstract entitled "Security with Low Communication Overhead" by D. Beaver, et al., *Proc. Advances in Cryptology–CRYPTO '90*, Santa Barbara, CA, Aug. 11–15, 1990, pp. 62–76, (found at http://seclab.cs.ucdavis.edu/papers.html).

Abstract entitled "The Round Complexity of Secure Protocols" by D. Beaver, et al., *Proc. of the 22nd Annual ACM Symposium on Theory of Computing*, Baltimore, MD, May 14–16, 1990, pp. 503–513. (found at http://seclab.cs.udcavis.edu/papers.html).

Abstract entitled "PACLs: An Access Control List Approach to Anti–Viral Security" by D.R. Wichers, et al., *Proc. 13th National Computer Security Conference*, Washington, DC, Oct. 1–4, 1990, pp. 340–349. (found at http://seclab.cs.ucdavis.edu/papers.html).

Abstract entitled "Verification of Secure Distributed Systems in Higher Order Logic: A Modular Approach Using Generic Components" by J. Alves–Foss, K. Levitt, *Proc. of the 1991 IEEE Computer Seociety Symposium on Research in Security and Privacy*, Oakland CA May 20–22, 1991, pp. 122–135. (found at http://seclab.cs.ucdavis.edu/papers.html).

Abstract entitled "An Authentication Mechanism for USENET" by M. Bishop, *Proc. of the Winter 1991 USENIX Conference*. Jan. 21–25, 1991, pp. 281–287, (found at http://seclab.cs.ucdavis.edu/papers.html).

Abstract entitled "Password Management" by M. Bishop, COMPCON Spring '91. *Digest of Papers*. San Francisco, CA, Feb. 25–Mar. 1, 1991, pp. 167–169. (found at http://seclab.cs.ucdavis.edu/papers.html).

Abstract entitled "Teaching Computer Security" by M. Bishop, May 1993.

Abstract entitled "Recent Changes to Privacy Enhanced Electronic Mail" by M. Bishop, *Journal of Internetworking: Research and Experience*. vol. 4, No. 1, Mar. 1993, pp. 47–59. (found at http://seclab.cs.ucdavis.edu/papers.html).

Abstract entitled "A Modified Random Perturbation Method for Database Security" by P. Tendick, N. Matloff, *ACM Transactions on Database Systems*, Mar. 1994, vol. 19, No. 1, pp. 47–63, (found at http://seclab.cs.ucdavis.edu/papers.html).

Short presentation entitled "Intrusion Detection for network Infrastructures" by S. Cheung, K.N. Levitt, C. Ko. *The 1995 IEEE Symposium on Security and Privacy*, Oakland CA, May 1995.

Master Thesis entitled "Paradigms for the Reduction of Audit Trails" by B. Wetmore, pp. i–6. Unable to obtain entire thesis—portion downloaded from http://seclab.cs.ucdavis.edu/papers.html, 1993.

"Open System Security—an Architectural Framework" by Arto T. Karila, (found at http://www/cs.purdue.edu/coast/archive/data/categ.30.html), Jun. 1991.

"A Few Attacks on the Zero Knowledge State Novell's Netware" by Greg Miller, pp. 1–11. (found at http://www.cs.purdue.edu/coast/archive/data/categ30.html), Jul. 30, 1996.

* cited by examiner

PARALLEL INTRUSION DETECTION SENSORS WITH LOAD BALANCING FOR HIGH SPEED NETWORKS

TECHNICAL FIELD OF THE INVENTION

This invention relates to computer networks, and more particularly to prevention of unauthorized access to a local network from computers external to the local network.

BACKGROUND OF THE INVENTION

Prevention of unauthorized access by outsiders to a computer network is a part of any network management program. This security problem has been complicated by recent trends in internetworking of a previously isolated private networks with value added networks, public networks (such as the internet), and with the networks of other enterprises.

Firewalls are one approach to preventing unauthorized access. Essentially, a firewall is a control layer inserted between an enterprise's network and the outside. It permits only some traffic to pass through. The firewall is configured by the administrator of the local network based on the enterprise's security policy. For example, the firewall may block traffic of a certain type, traffic from certain addresses, or traffic from all but a predetermined set of addresses.

Techniques used by network intruders for penetrating network system security have evolved in pace with sophisticated methods for detecting the intruders. Detection methods include software solutions, specifically, software intrusion detection systems, which continually monitor network traffic and look for known patterns of attack.

When an intrusion detection system detects inappropriate activity, it generates appropriate alarms and provides other responses while the attack is occurring. For example, the intrusion detection system might report the attack, log the attack, and terminate the misused connection.

One approach to intrusion detection relies on known patterns of unauthorized activity, referred to as "signatures". These signatures are stored, and, in real time, compared to the packet flow incoming to the network. If a match is found, the incoming datastream is assumed to be misused.

Many existing intrusion detection systems are hostbased rather than network based. A host-based system resides on a particular host computer and detects only attacks to that host. A network-based system is connected at some point on a local network and detects attacks across the entire local network.

As an example of network-based intrusion detection, one known pattern of unauthorized access is associated with "IP spoofing", whereby an intruder sends messages to a computer with an IP address indicating that the message is from a trusted port. To engage in IP spoofing, the intruder must first use a variety of techniques to find an IP address of a trusted port and must then modify the packet headers so that it appears that the packets are coming from that port. This activity results in a signature that can be detected when matched to a previously stored signature of the same activity.

SUMMARY OF THE INVENTION

One aspect of the invention is a method of detecting unauthorized access on a network as indicated by signature analysis of packet traffic on the network. A plurality of intrusion detection sensors are connected at a network entry point associated with an internetworking device, such as a router or switch. The packet load to the sensors is "load balanced", such that said packets are distributed at least at a session-based level. The load balancing may be at a lower (packet-based) level, which tends to more evenly distribute the load on each sensor but requires additional processing external to the sensors or requires sharing of session-level data between sensors. The sensors are used to detect signatures indicated by the packets. Packets indicating a composite signature from multiple sessions are delivered to a network analyzer, which detects the composite signatures. The results of the detection performed by the sensors and the network analyzer are used to determine if there is an attempt to gain unauthorized access to the network.

An advantage of the invention is that it provides a processor-based intrusion detection system that can keep up with the high traffic throughput of today's networks. Existing sensors may be used, and the solution provided by the invention is easily scalable.

DETAILED DESCRIPTION OF THE INVENTION

The invention described herein is directed to a network intrusion detection system that accommodates the higher packet throughput enabled by today's high speed networks. Multiple intrusion detection sensors are used at the entry point to the network, specifically, at an "internetworking device" such as a router or a switch. These devices have in common the function of linking a local network to an external network, such as another local network or to a wide area network using a telecommunications link.

As explained below, the internetworking device, whether a router or switch, is processor-based and includes load balancing programming, which controls how packets are distributed from the internetworking device to the sensors for processing.

Two specific embodiments of the invention are described herein. A first embodiment provides multiple sensors at the output of a router. A second embodiment provides multiple sensors inside a switch. In both cases, each sensor is identical to the other sensors and is capable of performing the same intrusion detection processing. The sensors operate in parallel, and analyze packets to determine if any packet or series of packets has a "signature" that matches one of a collection of known intrusion signatures. Thus, the invention provides an easily scalable solution to providing an intrusion detection system whose ability to perform signature analysis can keep up with high speed networks.

For simplicity of description, each of the embodiments described herein is described in terms of signature analysis of packet datastreams incoming to a local network. However, the same concepts apply to outgoing traffic.

Intrusion Detection System Overview

Figure 1:
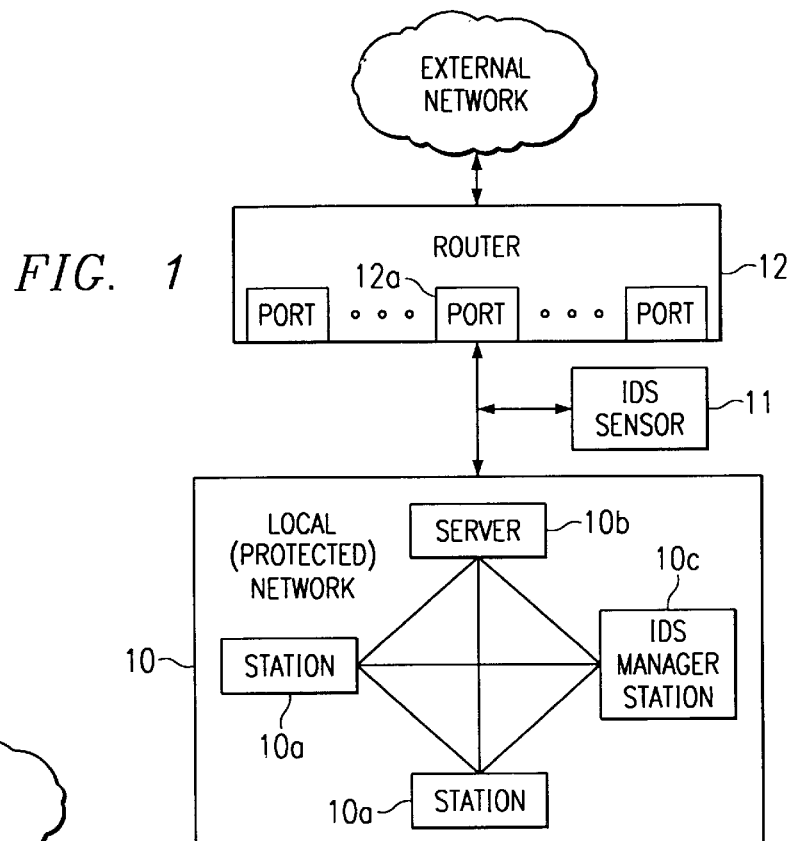
FIG. 1 illustrates a typical computer network, with a "local network" protected by an intrusion detection system (IDS) sensor in accordance with the invention.

FIG. 1 illustrates a typical computer network, with a "local network" 10 protected by an intrusion detection system (IDS) sensor 11 in accordance with the invention. The local network 10 is the network being secured, with the rest of the network being referred to herein as the "external network". It is assumed that local network 10 receives and sends data in "packets", which are switched between network segments via router 12.

"Intrusion detection" is a term familiar in the art of network security. It includes the various attacks discussed herein, and in general, all types of misuse that may be indicated by signatures.

Router 12 is of a type known in the field of networking, making connections between networks at the transport layer of the OSI model. Router 12 decides whether to forward a packet by examining the packet's protocol level addresses. Router 12 is capable of handling any datalink protocol, thus, ethernet, FDDI, ISDN, and so on are handled in the same manner.

Router 12 inspects packets incoming from the external network to determine which should be forwarded into the local network 10. Similarly, packets originating in the local network are inspected to determine whether they are to be forwarded to the external network. As stated above, router 12 is a type of "internetworking device" in that it is used to connect separate network segments. A characteristic of a router is its ability to communicate with other routers outside the local network 10 to determine the best routes for network traffic.

As explained below, sensor 11 analyzes packets to determine if traffic into and out from local network 10 is misused. Sensor 11 may be implemented as a hardware device or as a combination of hardware and software. Sensor 11 processes a packet by examining its header and payload, as well as its relationship to other packets in the data stream. It detects "signatures" associated with misused access, where a "signature" is an pattern of one or more events represented by strings of binary code.

Although local network 10 is illustrated as having a "mesh" type topology, this is for purposes of example. Local network 10 could be any system of interconnected computer stations 10a, typically having a server 10b to function as a sort of gateway to network resources.

Local network 10 may include an IDS manager station 10c, which provides system management personnel with a user interface and system management functionality especially directed to intrusion detection and response. In this case, sensor 11 might forward alarms to station 10c, which may then alert the system manager or automatically take action. Alternatively, sensor 11 may autonomously comprise the entire intrusion detection system. In this case, sensor 11 may have appropriate functionality so that if it detects an intrusion, it can take appropriate action, such as terminating the connection.

An example of a suitable IDS sensor 11 is the sensor device provided with the NETRANGER intrusion detection system, available from Cisco Systems, Inc. The NETRANGER product also includes director management software for use at station 10c. A feature of the NETRANGER sensors is their ability to monitor almost any type of IP (internet protocol) network, ranging from internet connections, LAN segments, and the network side of dial-in modems. The data link protocol might be any one of various types, such as ethernet, fast ethernet, token ring, or FDDI. However, other types of intrusion detection sensors (often referred to as "signature processors") could be used and other types of protocols can be analyzed.

In the example of this description, which is in terms of network traffic using the IP protocol, the packets incoming to local network 10 may adhere to various protocols running on top of the IP protocol or to IP extensions. For example, the IP protocol may have a TCP or UDP protocol running on top of it. The TCP (transmission control protocol) enables two hosts to establish a connection and exchange streams of data and includes various delivery guarantees. The UDP (user datagram protocol) is used primary for broadcasting messages and provides few error recovery services. The ICMP (internet control message protocol) is an extension to IP and supports packets containing various error, control, and informational messages.

In the example of this description, sensor 11 is capable of examining packets for each of these three IP protocols, i.e., TCP, UDP, and ICMP. In today's networking environments, these IP protocols cover most internet traffic. However, the same concepts could be applied to examination of other protocols, including alternatives to IP.

Sensor 11 captures network data, and parses each packet before signature analysis occurs. Various capabilities of sensor 11 to support signature analysis include, but are not limited to, checksum verification, hop count checking, IP option checking, MTU checking for maximum packet size, IP fragment reassembly, and TCP stream reassembly, as well as pattern matching.

The signatures detected by sensor 11 include those associated with malicious intent attacks, denial of service attacks, evasion attempts, and other methods of misuse.

Signature Analysis Overview

Signature analysis uses one or more intrusion detection sensors 11, which are installed on a network segment and are transparent to network performance. For purposes of example, the operation of a typical intrusion detection sensor 11 is described herein. However, it should be understood that the basic concepts of the invention are not limited to a particular type of sensor, and can be applied in the context of any hardware/software configuration that is a intrusion signature "sensor" in that it performs signature analysis.

A sensor 11 contains a detection engine, which examines each packet incoming to the sensor 11, including its header and payload. The sensor 11 also analyzes each packet's relationship to adjacent and related packets in the data stream. If the analysis indicates misuse, the sensor may act autonomously to take action, such as disconnection, or it may send an alarm to a separate intrusion detection management station.

The signature detection engine of a sensor 11 uses a signature recognition methodology that includes both context and content oriented signature analysis. Context-oriented signatures consist of known network service vulnerabilities that can be detected by inspecting packet headers. Examples of context-oriented signatures are SATAN, TCP Hijacking, and IP spoofing signatures. Content-oriented signatures require the inspection of data fields within a packet to determine if an intrusion has occurred at the application level. These include e-mail and web attack signatures. A sensor 11 might also have the capability to be programmed to analyze packets for customized signatures for a particular network.

Signatures may also be categorized as being either atomic or composite. Atomic signatures comprise information (context or content) in a single packet. Composite signatures comprise information in multiple packets.

Network with Parallel Sensors External to Router

Figure 2:
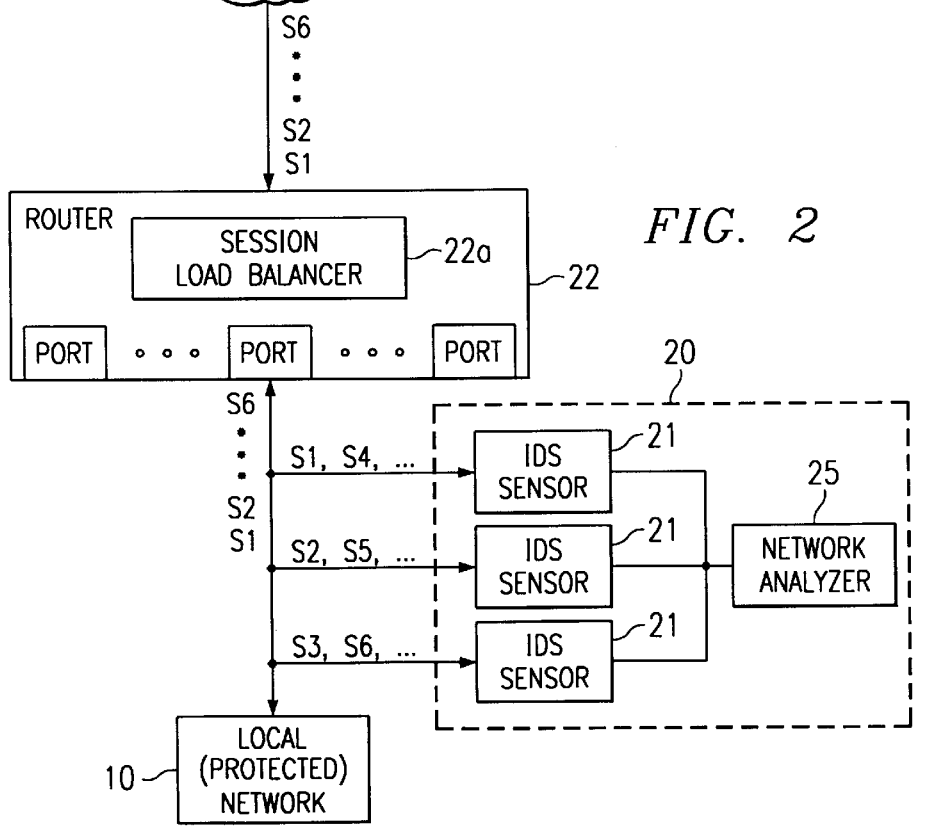
FIG. 2 illustrates an intrusion detection system, used with a router that provides session-based load balancing, and having multiple sensors operating in parallel.
Figure 3:
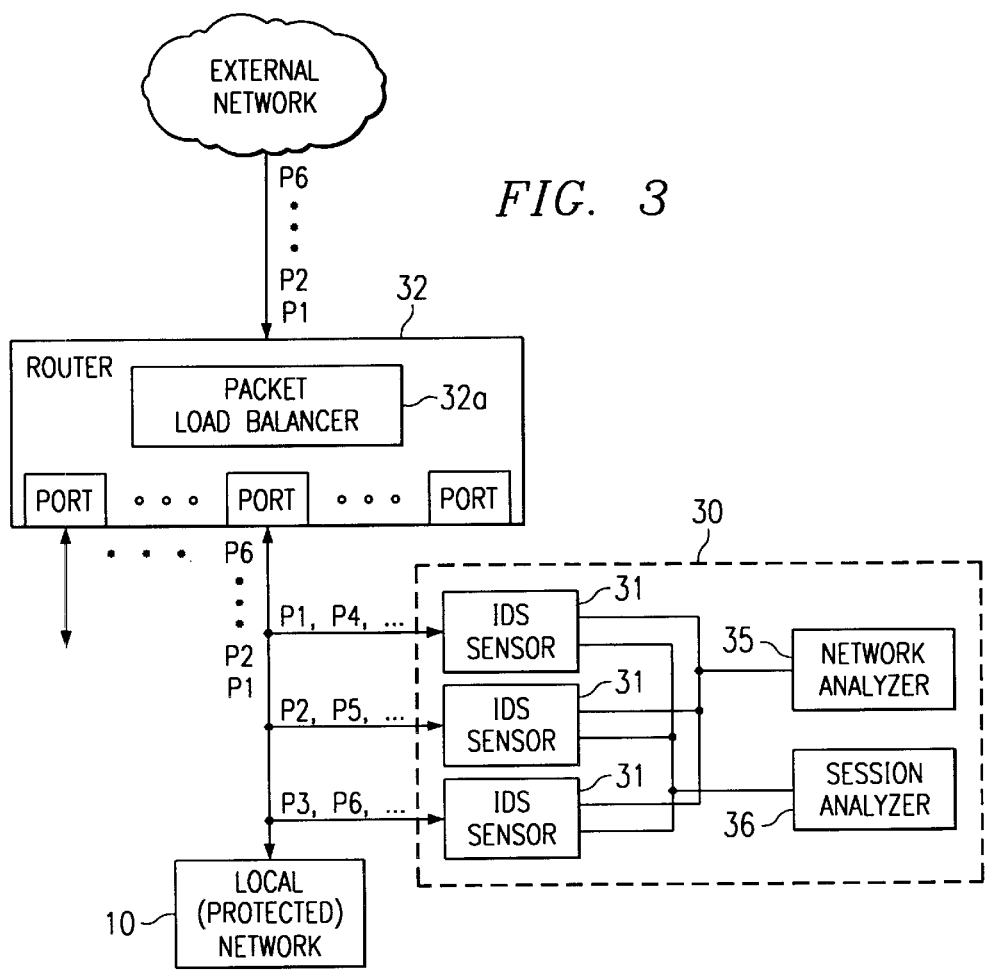
FIG. 3 illustrates an intrusion detection system, used with a router that provides packet-based load balancing, and having multiple sensors operating in parallel.

FIGS. 2 and 3 illustrate two embodiments of an intrusion detection system, used with a router, having multiple sensors 21 operating in parallel. In the example of this description, both embodiments have three sensors, but any number of sensors could be used. In each embodiment, the router has a load balancing unit, which distributes packets among the sensors.

In the embodiment of FIG. 2, the load balancing is "session-based", which means that each sensor 21 handles a portion of the sessions incoming to the network. A stream of packets, S1, S2, . . . S6, . . . is illustrated. In the example of FIG. 2, the load balancing is such that S1 goes to a first sensor, S2 to a second, S3 to a third, S4 to the first, and so on. Thus, each sensor 21 handles one-third of the sessions in a given datastream.

A network analyzer 25 receives packets from different sessions, which may be used to detect certain types of composite signatures. For example, a "ping" type signature is indicated by multiple sessions that attempt to connect to different destinations with the local network. Single packets indicating ping behavior can be delivered to network analyzer 25, which then monitors similar packets from different sessions to see if a ping pattern is indicated. In general, network analyzer 25 detects signatures of attacks against multiple hosts and different sessions. Such attacks are often detecting using statistical correlations.

Network analyzer 25 can be implemented using state information. As an example, state information stored in network analyzer 25 may depend on the connectivity associated with a particular signature. For example, a ping sweep signature is a "one-to-many" signature because a source host transmits to a number of destination hosts. Analysis of the ping sweep signature, includes tracking the number of destination hosts to which a source host transmits an ICMP echo request packet. If the threshold of destination hosts is N, then a table of N-1 addresses is maintained for each source host that has transmitted an ICMP echo request packet. Another example of a signature requiring network analyzer 35 is a signature known as a "TCP scan" signature, which is indicated by a series of connections from the same source to different hosts.

FIG. 3 illustrates an alternative intrusion detection system 30, also having a router 32 and parallel sensors 31, but where the load balancing is "packet-based". Router 32 has a load balancing unit 32a, which distributes a packet stream comprised of packets P1, P2, . . . P6 . . . . The load balancing is such that P1 goes to a first sensor, P2 to a second, P3 to a third, P4 to the first, and so on.

As explained above, IP traffic may contain various packet types, such as TCP, UDP, and ICMP. The packet-based load balancing is especially beneficial under "flooding" conditions. For example, packet flooding might result in a series of only TCP packets. Even in this situation, each sensor 31 processes only one-third of the packets. Thus, even if the traffic is flooded with one type of packet, each processor will handle the same load.

Like intrusion detection system 20, system 30 uses a network analyzer 35, which detects signatures requiring packet information from packets of different sessions. As explained above, network analyzer 35 primarily detects correlations among signatures in different sessions.

Additionally, system 30 has a session analyzer 36, which stores information used to detect signatures from different packets in the same session. For example, a first sensor 31 might receive a packet indicating a signature that would be comprised of different packets from the same session. Because that sensor 31 does not necessary process all packets from the same session, the suspicious packet would be delivered to session analyzer 36, which would receive suspicious packets from other sensors 31, and determine whether the signature had been transmitted to the local network 10. Session analyzer 36 might be as simple as a counting mechanism, that counts signatures of a certain type. Or session analyzer 36 might process state information, such as determining that a packet indicates a state A, then determining if a second packet indicates a state B, etc.

For the embodiments of both FIG. 2 and FIG. 3, the load balancing unit 22a or 32a could be implemented as software or hardware, or some combination of the two. Each sensor 21 or 31 receives only the packets that it will process.

For a software implementation of the load balancing unit 22a or 32a, routing to sensors 21 and 31 can be performed with appropriate modifications to existing router software. Like other IP routing, the decision of which sensor 21 or 31 will receive a particular packet (or session of packets) is determined by an address associated with the sensor. For example, each sensor 21 or 31 might have a unique IP address so that routing is performed as with other IP-addressed destinations. The sensors receive copies of the same packets that are destined to the local network. Specifically, a "copy to" operation is used to send each packet to the appropriate sensor as well as to the destination in local network 10 to which the packet is addressed. For example, router 21 may encapsulate the packet so that its new header information addresses the packet to the appropriate sensor. The addressing to sensors 21 or 31 need not be IP addressing—various other transport addressing mechanisms could be used.

If desired, the load balancing software can be programmed so that certain destinations are included or excluded. For example, router 22 or 32 could be programmed so that only packets destined for a given range of IP addresses are copied to intrusion detection sensors. Thus, if router 22 or 32 were connected to two local networks, only packets incoming from the external network could be directed to the sensors and not packets being transported between the local networks.

Network with Sensors Internal to Switch

Figure 4:
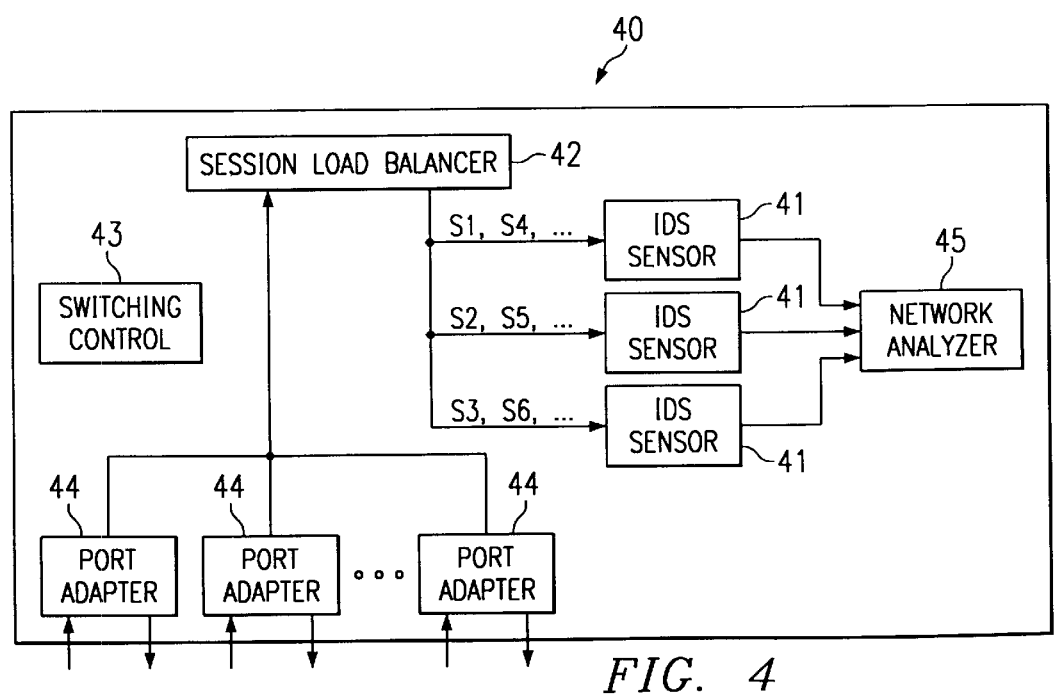
FIG. 4 illustrates an intrusion detection system, integrated into a switch, and having session-based load balancing to multiple sensors operating in parallel.
Figure 5:
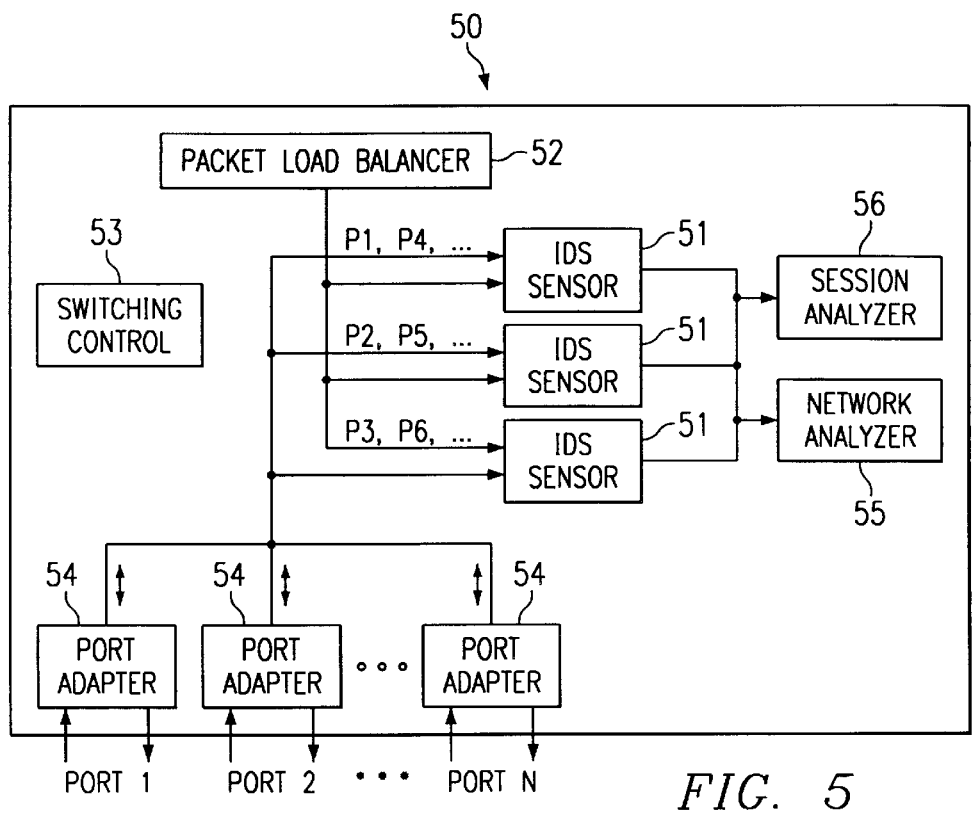
FIG. 5 illustrates an intrusion detection system, integrated into a switch, and having packet-based load balancing to-multiple sensors operating in parallel.
Figure 6:
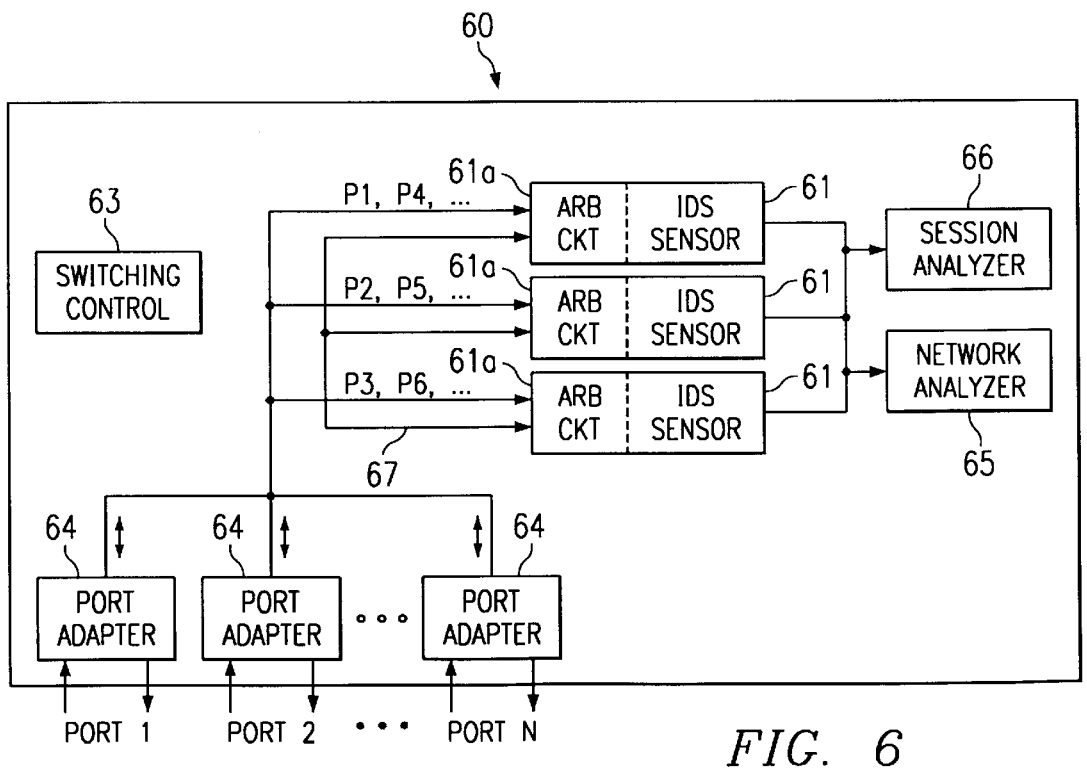
FIG. 6 illustrates an intrusion detection system, integrated into a switch, and having packet-based load balancing to multiple sensors operating in parallel, where the load balancing is achieved with arbitration circuits at each sensor.

FIGS. 4–6 illustrate various configurations for using intrusion detection sensors operating in parallel, internal to a switch. As explained below, FIG. 4 illustrates an intrusion detection system with session-based load balancing, whereas the systems of FIGS. 5 and 6 have packet-based load balancing. FIGS. 4 and 5 illustrate two different ways of using a load balancing unit within the switch, whereas FIG. 6 illustrates an arbitration circuit at each sensor. Either session-based or packet-based load balancing may be used with any of the three techniques for distributing packets.

For purposes of this description, a "switch" is a multiport device that filters and forwards packets between network segments. It operates at multiple layers of the OSI model and therefore is capable of supporting any packet protocol. A switch may or may not include routing capabilities, and in the former case, is sometimes referred to as a routing switch.

As stated above, a switch is a type of "internetworking" device. An example of a suitable switch, and the one used for purposes of example herein, is the CATALYST 6000 switch manufactured by Cisco Systems, Inc. This switch has a backplane and bus architecture to which sensors may be easily connected, typically by connecting one or more printed circuit boards, each having circuitry for one or more sensors.

For purposes of this description, only those elements of the switch relevant to intrusion detection are illustrated. A typical high speed data switch has a complex internal structure with various buffers and control structures other than shown in FIGS. 3–6.

FIG. 4 illustrates a switch 40 having internal intrusion detection sensors 41. Switch 40 has multiple ports, each having an associated port adapter 44 and each capable of supporting a single end station or another network. Packets are forwarded by switch 40 based on the destination address. Essentially, the operation of switch 40 is such that its control unit 43 ensures that only packets having a certain address are output from the port associated with that address.

A high speed internal bus transports packets within switch 40. As an example, internal bus might transport data at a rate of 16 gigabits per second, whereas the output from each port 44 is 100 megabits per second. Thus, the packet throughput internal to switch 40 exceeds the throughput of any output port on the switch 40. In a bus-based switch such as switch 40, sensors 41 may be connected onto the bus, but the invention could be implemented with other switches with different internal transport mechanisms. For example, the invention could be implemented with a "worm-hole routing" type switch.

For purposes of intrusion detection, it is assumed that no single sensor could process all packets being processed by the switch 40. A sensor at each port would not have access to all packets. The solution, as illustrated in FIG. 4, is the use of multiple intrusion detection sensors 41 and a load balancer 42 internal to switch 40. Load balancer 42 distributes traffic so that each sensor 41 processes only one Nth of the traffic in and out of switch 40, where N is the number of sensors 41.

Sensors 41 may be substantially the same as sensors 21 and 31 of FIGS. 2 and 3. Various types of sensors 41 can be used, with the common characteristic being that each sensor 41 analyzes packets to determine if unauthorized intrusion is indicated.

In the embodiment of FIG. 4, load balancer 42 provides "session-based" load balancing, where all packets for a particular session are delivered to the same one of sensors 31. Load balancer 42 operates by inspecting each packet of the entire stream of network traffic and retransmitting them to the appropriate sensor 41.

Sensors 41 each access a network analyzer 45, which accommodates signatures that require analysis of packets from more than one session. Network analyzer 45 is similar to the network analyzers 25 and 35 described above, and receives packets from sensors that indicate an attack across multiple sessions.

FIG. 5 illustrates an alternate embodiment, a switch 50, which implements "packet-based" load balancing. In this embodiment, packets from the same session may be distributed to different sensors 51.

Rather than receiving and retransmitting packets, load balancer 52 delivers control signals to sensors 51. These control signals communicate to each sensor 51 which packets are to be processed by that sensor 51.

For packet-based load balancing, switch 50 has both a network analyzer 55 and a session analyzer 56. These elements operate in a manner similar to the network analyzers 25, 35, 45 and session analyzer 36 described above.

In the embodiments of both FIG. 4 and FIG. 5, load balancing is achieved with a load balancing unit external to the sensors. Two alternative means for distributing packets are described—one involving retransmittal of packets through the load balancer and the other involving the use of control signals to the sensors. These techniques could be interchanged for session-based and packet-based load balancing.

FIG. 6 illustrates a variation of a packet-based load balancing switch, a switch 60 whose sensors 61 each have an arbitration circuit 61a for determining packet distribution. An arbitration bus 67 carries, among the sensors 61, control signals used to control packet distribution. The arbitration circuit 61a at the front end of each sensor 61 determines which packets shall be analyzed by that sensor. Although the embodiment of FIG. 6 is shown as being packet-based, session-based arbitration could also be performed and would eliminate the need for shared signature memory 66.

Other Embodiments

Although the present invention has been described in detail, it should be understood that various changes, substitutions, and alterations can be made hereto without departing from the spirit and scope of the invention as defined by the appended claims.

What is claimed is:

1. A method of detecting unauthorized access on a network as indicated by signature analysis of packet traffic on the network, comprising the steps of:

providing a plurality of intrusion detection sensors at a network entry point associated with an internetworking device;

balancing the packet load to said sensors, such that said packets are distributed at least at a session-based level;

detecting signatures indicated by said packets delivered to said sensors;

delivering packets indicating a composite signature from multiple sessions to a network analyzer;

detecting composite signatures delivered to said network analyzer;

using the results of said detecting steps to determine unauthorized access to said network.

2. The method of claim 1, wherein said internetworking device is a router, and wherein said sensors are attached between said router and a local network.

3. The method of claim 1, wherein said internetworking device is a switch, and wherein said sensors are integrated into said switch.

4. The method of claim 1, wherein said balancing step is performed by distributing said packets at a packet-based level, and further comprising the steps of delivering packets indicating a composite signature to a session analyzer and of using said session analyzer to detect signatures indicated by packets delivered to it.

5. A method of detecting unauthorized access on a network as indicated by signature analysis of packet traffic on the network via a router, comprising the steps of:
   providing a plurality of intrusion detection sensors between said router and a local network;
   balancing the packet load to said sensors, such that said packets are distributed at least at a session-based level;
   detecting signatures indicated by said packets delivered to said sensors;
   delivering packets indicating a composite signature from multiple sessions to a network analyzer;
   detecting composite signatures delivered to said network analyzer;
   using the results of said detecting steps to determine unauthorized access to said network.

6. The method of claim 5, wherein said balancing step is performed by distributing said packets at a packet-based level, and further comprising the steps of delivering packets indicating a composite signature to a session analyzer and of using said session analyzer to detect signatures indicated by packets delivered to it.

7. A method of using a switch to detect unauthorized access on a network as indicated by signature analysis of packet traffic on the network via the switch, comprising the steps of:
   providing a plurality of intrusion detection sensors within said switch;
   balancing the packet load to said sensors, such that said packets are distributed at least at a session-based level;
   detecting signatures indicated by said packets delivered to said sensors;
   delivering packets indicating a composite signature from multiple sessions to a network analyzer;
   detecting composite signatures delivered to said network analyzer;
   using the results of said detecting steps to determine unauthorized access to said network.

8. The method of claim 7, wherein said balancing step is performed by distributing said packets at a packet-based level, and further comprising the steps of delivering packets indicating a composite signature to a session analyzer and of using said session analyzer to detect signatures indicated by packets delivered to it.

9. The method of claim 7, wherein said balancing step is performed by a load balancing unit of said switch.

10. The method of claim 7, wherein said balancing step is performed by an arbitration circuit at each said sensor and an arbitration control bus linking said sensors.

11. An intrusion detection system for use with a network router that delivers traffic to a local network, comprising:
   a plurality of intrusion detection sensors connected to a communications link between said router and said local network, each said sensor operable to operate in parallel to perform signature analysis on packet traffic distributed by said router to said sensors on at least a session-based level; and
   a network analyzer operable to receive packets indicating a composite signature from multiple sessions and to analyze signatures indicated by said packets delivered to it.

12. The system of claim 11, wherein said router distributes said packets at a packet-based level, and further comprising a session analyzer that receives packets indicating signatures from different packets of the same session and detects signatures indicated by said packets delivered to it.

13. An improved switch for providing intrusion detection for switched network traffic, the improvement comprising:
   a plurality of intrusion detection sensors integrated within said switch, each said sensor operable to operate in parallel to perform signature analysis on packet traffic distributed within said switch;
   a load balancing unit for distributing packets on at least a session-based level to said sensors; and
   a network analyzer operable to receive packets indicating a composite signature from multiple sessions and to detect signatures indicated by said packets delivered to it.

14. The switch of claim 13, wherein said load balancing unit distributes said packets at a packet-based level, and further comprising a session analyzer that receives packets indicating signatures from different packets of the same session and detects signatures indicated by said packets delivered to it.

15. The switch of claim 13, further comprising a bus that carries network traffic within said switch to ports of said switch and wherein said sensors are directly connected to said bus.

16. The switch of claim 13, wherein said load balancing unit operates by receiving packets and re-transmitting them to said sensors.

17. The switch of claim 13, wherein said load balancing unit operates by delivering control signals to said sensors.

18. An improved switch for providing intrusion detection for switched network traffic, the improvement comprising:
   a plurality of intrusion detection sensors integrated within said switch, each said sensor operable to operate in parallel to perform signature analysis on packet traffic distributed within said switch;
   an arbitration bus linking each said sensor for communicating arbitration control signals among said sensors, said arbitration control signals operable to distribute packets to said sensors on at least a session-based level;
   an arbitration circuit associated with each said sensor for generating said arbitration signals; and
   a network analyzer operable to receive packets indicating a composite signature from multiple sessions and to detect signatures indicated by said packets delivered to it.

19. The system of claim 18, wherein said arbitration bus distributes said packets at a packet-based level, and further comprising a session analyzer that receives packets indicating signatures from different packets of the same session and detects signatures indicated by said packets delivered to it.

20. A method of detecting unauthorized access on a network, comprising the steps of:
   providing a plurality of intrusion detection sensors at a network entry point associated with an internetworking device;
   balancing a packet load to said sensors, such that packets are distributed at a packet-based level;
   detecting signatures indicated by said packets delivered to said sensors;
   delivering packets indicating a composite signature to an analyzer;
   detecting a composite signature delivered to said analyzer;
   using the results of said detecting steps to determine unauthorized access to said network.

21. A method of detecting unauthorized access on a network, comprising the steps of:

providing a plurality of intrusion detection sensors between a router and a local network;

balancing a packet load to said sensors, such that packets are distributed at a packet-based level;

detecting signatures indicated by said packets delivered to said sensors;

delivering packets indicating a composite signature to an analyzer;

detecting a composite signature delivered to said analyzer;

using the results of said detecting steps to determine unauthorized access to said network.

22. A method of using a switch to detect unauthorized access on a network, comprising the steps of:

providing a plurality of intrusion detection sensors within said switch;

balancing a packet load to said sensors, such that packets are distributed at a packet-based level;

detecting signatures indicated by said packets delivered to said sensors;

delivering packets indicating a composite signature to an analyzer;

detecting a composite signature delivered to said analyzer;

using the results of said detecting steps to determine unauthorized access to said network.

23. An intrusion detection system for use with a network router that delivers traffic to a local network, comprising:

a plurality of intrusion detection sensors connected to a communications link between said router and said local network, each said sensor operable to operate in parallel to perform signature analysis on packet traffic distributed by said router to said sensors on a packet-based level; and an analyzer operable to receive packets indicating a composite signature and to detect a composite signature indicated by said packets received.

24. A switch for providing intrusion detection for switched network traffic, the switch comprising:

a plurality of intrusion detection sensors integrated within said switch, each said sensor operable to operate in parallel to perform signature analysis on packet traffic distributed within said switch;

a load balancing unit for distributing packets on a packet-based level to said sensors; and an analyzer operable to receive packets indicating a composite signature and to detect a composite signature indicated by said packets received.

25. A switch for providing intrusion detection for switched network traffic, the switch comprising:

a plurality of intrusion detection sensors integrated within said switch, each said sensor operable to operate in parallel to perform signature analysis on packet traffic distributed within said switch;

an arbitration bus linking each said sensor for communicating arbitration control signals among said sensors, said arbitration control signals operable to distribute packets to said sensors on a packet-based level;

an arbitration circuit associated with each said sensor for generating said arbitration signals; and an analyzer operable to receive packets indicating a composite signature and to detect a composite signature indicated by said packets received.

* * * * *

UNITED STATES PATENT AND TRADEMARK OFFICE
CERTIFICATE OF CORRECTION

PATENT NO.    : 6,578,147 B1
DATED         : June 10, 2003
INVENTOR(S)   : Steven D. Shanklin et al.

It is certified that error appears in the above-identified patent and that said Letters Patent is hereby corrected as shown below:

<u>Title page,</u>
Item [56], References Cited, OTHER PUBLICATIONS, insert
-- Introduction to Algorithms", Cormen et al., Ch. 34, pp. 853-885, Copyright © 1990 --.

Signed and Sealed this

Seventeenth Day of February, 2004

JON W. DUDAS
*Acting Director of the United States Patent and Trademark Office*